Patented Mar. 29, 1949

2,465,960

UNITED STATES PATENT OFFICE 2,465,960

PRODUCTION OF ASPHALT COMPOSITION

Jacob van den Berge, Amsterdam, Netherlands, assignor to Shell Development Company, San Francisco, Calif., a corporation of Delaware No Drawing. Application June 9, 1947, Serial No. 753,573. In the Netherlands May 1, 1940

Section 1, Public Law 690, August 8, 1946
Patent expires May 1, 1960

14 Claims. (Cl. 196—22)

This invention relates to a process for the production of improved bituminous compositions, and to the improved compositions produced thereby. More particularly, it relates to the production of asphaltic bituminous compositions from asphaltic mineral oils and products thereof, such as asphaltic products obtained by distillation, extraction or precipitation, or from residues produced in the cracking or destructive hydrogenation of mineral oils or mineral oil products.

It is well recognized in the art of manufacturing asphaltic compositions that the basic materials such as petroleum residues may be materially altered in properties by subjecting them to various chemical treatments. For example, air-blown, i. e. oxidized or coating-type asphalts are usually prepared by blowing the charging stock, such as asphalt residue produced from asphalt-containing crude oils, with air or other oxygen containing gas at an elevated temperature. The products thus obtained possess desirable low temperature susceptibilities and higher melting point for a given penetration index as compared with unoxidized asphalts. The air-blowing may be effected with or without the usual oxidation-promoting variable valence metal catalysts. Usually, a residual oil is blown at 525–575° F. at the rate of about 30 to 50 cubic feet of air per minute per ton of asphalt, for a period of five to twelve hours. Residual oils derived from semi-asphaltic and non-asphaltic petroleums require more rigorous treatment than asphaltic petroleum residues to obtain products of the same fusing point.

In all processes for modifying the characteristics of asphalts, the final properties of the modified asphalt will depend on a large number of variable factors such as: the varied compositions or types of the original materials, the length of treatment, the treating agents, the order of successive treatments, the conditions of treatments such as temperature, presence or absence of catalyst, etc.

It is therefore a principal object of the present invention to provide an improved process for the production of asphaltic compositions having desirable properties, especially improved with respect to melting point. A further object is to provide a process for producing asphaltic compositions of the character of air-blown asphalt but requiring a much shorter period of time to effect the desired changes in physical properties than is required for air blowing to produce a composition with equivalent properties. Other objects will become apparent from the following detailed description of the invention.

It has now been found that asphaltic bituminous compositions, often with very special properties, may be prepared by treating asphaltic bitumens with cyclic organic compounds containing attached to the cyclic nucleus at least three polar oxygen-containing groups at least one of which also contains a nitrogen, particularly, nitro or nitroso group, and at least one of which is a nitrogen-free acidic group.

More specifically, it has been found that asphaltic bituminous compositions of petroleum or mineral oil origin may be desirably altered in physical properties and concomitant utility by subjecting them to treatment at an elevated temperature for a relatively short period of time in the presence of the general class of compounds as defined above and as represented by such substances as dinitrocresol, trinitrophenol, dinitrosophenol, dinitrobenzenesulfonic acid, dinitro naphthalene sulfonic acid, trinitrobenzoyl chloride, etc.

By cyclic compounds are meant isocyclic (both alicyclic and aromatic) as well as heterocyclic compounds.

Oxygen containing acid groups other than nitro and nitroso groups comprise hydroxyl (—OH), sulfonic (—SO₃H), sulfinic (—SO₂H), sulfonylchloride (—SO₂Cl), carboxyl (COOH), carbonyl chloride (COCl), and like groups.

In addition to the nitro and/or nitroso groups and the other oxygen-containing acid groups which are present in the modifying agents of this invention, those agents may also contain other substituent groups, which, however, need not be bound to a cyclic nucleus. Examples of such substituent groups are: alkyl, alkoxy, aldehyde, keto, amino, and imino groups, halogens, etc.

The modifying agents are generally utilized in accordance with the invention in small proportions, namely, from a fraction of one percent up to a few percent, based on the weight of the asphalt, e. g. up to 5% by weight. It will be understood that the weight of the modifying agent used in a given case will depend on a number of factors including the nature of the asphaltic material, the nature of the modifying agent, the length of the treating period to be employed, the conditions of treating, and the results desired.

The treatment of the asphalt in the presence of the modifying agent generally is carried out at an elevated temperature. It is preferable to heat the mixture of asphalt and modifying agent to a temperature above about 100° C., but not above the temperature at which appreciable decomposition and degradation, such as cracking, of the asphalt begins to take place. In general, the higher the temperature of the treatment, the shorter the period of time required to obtain the desired changes in properties of the asphalt. In general, the temperature will not be above 450–500° C., while it is preferable to use a temperature which is not above about 400° C.

The treatment may be effected by incorporating the substances, i. e. modifying agents, by admixture in the asphaltic bitumen, or the material from which it is to be produced, e. g. the crude oil residue. This is most readily brought about when the bitumen is present in the liquid state. When it is not in the liquid state, it may be liquefied, for example, by heating or by dissolution in a suitable solvent. The substances to be admixed may also be previously taken up in a suitable solvent or diluent.

The process according to the present invention provides a simple method for producing asphalts with the properties most desirable for special applications. The importance of this process will be evident when it is borne in mind that bitumens with widely divergent properties are recommended for the numerous industrial application of asphaltic bitumens.

The usual air-blowing treatment of asphaltic bitumens is applied for the purpose of raising the melting points and in general also the penetration indices. Now, by application of the present invention, more possibilities are offered and the desired effects can be obtained in a much simpler manner than by applying the usual air-blowing process, for products of divergent penetration indices and melting points can be obtained in a very short time.

By application of the present invention, it is even possible to obtain asphaltic bitumens with penetration indices and melting points unattainable by blowing. Furthermore, the penetration index and melting point of asphaltic bitumens which have already been air-blown may be further raised by applying the process of this invention.

By penetration-index is understood a figure indicating the temperature-sensitivity and as a rule derived from a penetration test, usually at 25° C., and the softening point (ring and ball), vide Kolloid Zeitschrift 76, No. 1, 95–111 (1936).

A still further advantage of the process of the present invention over prior processes available for the modification of asphaltic bituminous substances is that the products obtained in accordance with this invention having melting points corresponding to the melting points of bitumens obtained by prior processes, e. g. by air-blowing, are more resistant to flow when applied on slanting surfaces, and in their also being more resistant to shock and vibration.

Bituminous compositions having an exceptionally good resistance against shock and against vibration are also obtained by adding the modifying agents of the invention to the initial material before the production of the bitumens, e. g. to the crude oil residue.

By application of the process of this invention it is even possible to obtain bitumens with ring and ball melting points lying above about 200° C. and with penetration indices, measured at 25° C., exceeding 10. Such asphaltic bitumens are highly suitable for application as protective layers on constructional material that has to be exposed to very high temperatures.

A still different effect is attained by the application of the invention to asphaltic bitumens produced from residues obtained in the cracking of mineral oils. In this case, too, the melting point of the bitumens is raised, but, the penetration index is lowered.

The bitumens obtained by the process of this invention are also eminently suitable to be applied as asphalts for briquetting, in view of the fact that on account of their great brittleness they are readily pulverized. Further, they are suitable for the production of printing inks. They also are particularly suitable for incorporation in construction materials of the character of mortar and concrete because of their water resistance and their improved ability to increase the amount of air that can be incorporated in the mortar or concrete mix.

Having set forth the nature of the invention and described the manner in which it will be practiced the following illustrative examples are given for the purpose of demonstrating the effectiveness of the process of the invention and they are not to be construed as limiting the invention in any way.

*Example I*

A Mexican straight-run asphaltic bitumen, ring and ball melting point=57° C., pen.$_{25}$=45, pen. index=+0.2, was treated for a few minutes at 180° C. with 1% by weight of dinitrocresol. The asphaltic bitumen thus obtained had a ring and ball melting point=74° C., a pen.$_{25}$=24 and a pen. index=+1.8.

*Example II*

A blown Venezuelan asphaltic bitumen, ring and ball melting point=86° C., pen.$_{25}$=40, pen. index=+4.6, was heated for a few minutes at 200° C. with different quantities of picric acid. The results are given in the table below:

| Per cent. by weight picric acid | Ring and Ball melting point in ° C. | Pen.$_{25}$ | Pen. Index |
|---|---|---|---|
| ½ | 106 | 29.0 | +5.9 |
| 1 | 135 | 18.5 | +7.3 |
| 2 | 205 | 12.0 | +10.0 |

*Example III*

A blown Mexican asphaltic bitumen, ring and ball melting point=85° C., pen.$_{25}$=33, pen. index=+4.0, was heated for a few minutes at 200° C. with one-half percent by weight of picric acid. The product thus obtained had a ring and ball melting point=129° C., a pen.$_{25}$=15 and a pen. index=+6.5.

*Example IV*

A Dubbs' cracked asphalt, ring and ball melting point=50° C., pen.$_{25}$=43, pen. index=−1.5, was heated for a few minutes at 180° C. with 2% by weight of picric acid. The bitumen thus obtained had a ring and ball melting point=62.5° C., a pen.$_{25}$=4.5 and a pen. index=−2.5.

*Example V*

A Venezuelan crude oil residue was blown for about 10 hours at a temperature of approximately 270–300° C. with air to an asphalt with a ring and ball melting point=115° C., a pen.$_{25}$=15 and a pen. index=+5.4. The product had a vibration resistance of 80 grams at 15° C.

The vibration resistance was measured according to the method described in communication No. 13 of the Central Corrosion Committee in the Netherlands, published by the Foundation for Testing Materials, established at The Hague.

When one-half per cent by weight picric acid was added to another sample of the same crude oil residue, and the product was then blown to an asphalt with a ring and ball melting point=114° C., a pen.$_{25}$=16 and a pen. index=+5.5, it was found that 10% less air than that used in the previous sample had sufficed to bring about the same change in the indicated properties, and, furthermore, the thus produced asphalt had a vibration resistance of 286 grams at 15° C. as compared with a value of 80 grams for the sample air-blown in the absence of the picric acid.

I claim as my invention:

1. Process for the manufacture of asphaltic bituminous compositions which comprises subjecting an asphaltic material to an elevated temperature of from about 100° C. to about 450° C. in the presence of a minor proportion of a cyclic organic compound which contains attached to the cyclic nucleus at least three oxygen-containing groups at least one of which also contains nitrogen and at least one of which is a nitrogen-free acidic group.

2. Process for the manufacture of asphaltic bituminous compositions which comprises subjecting an asphaltic material to an elevated temperature of from about 100° C. to about 450° C. in the presence of a minor proportion of a polynitro cyclic organic compound containing additionally attached to the cyclic nucleus at least one oxygen-containing acidic group.

3. Process for the manufacture of asphaltic bituminous compositions which comprises subjecting an asphaltic material to an elevated temperature of from about 100° C. to about 450° C. in the presence of a minor proportion of a phenol containing attached to the phenol nucleus at least two polar groups each of which contains both nitrogen and oxygen.

4. Process for the manufacture of asphaltic bituminous compositions which comprises subjecting an asphaltic material to treatment with an oxygen-containing gas at a temperature of from about 100° C. to about 450° C. for a period of time ranging upwards from a few minutes to several hours in the presence of from a fraction of one percent up to a few percent by weight, based on the weight of the asphaltic material, of a polynitrophenol.

5. Process for the manufacture of asphaltic bituminous compositions which comprises subjecting a mineral oil asphaltic material to a temperature of from about 100° C. to about 450° C. in the presence of a minor proportion of an aromatic compound containing attached to the aromatic nucleus at least three oxygen-containing polar groups at least one of which also contains nitrogen and at least one of which is a nitrogen-free acidic group.

6. Process for the manufacture of asphaltic bituminous compositions which comprises subjecting a mineral oil asphaltic bitumen to a temperature of from about 100° C. to about 450° C. in the presence of a minor proportion up to about 5% by weight of a polynitrophenol.

7. Process for the manufacture of asphaltic bituminous compositions which comprises subjecting a mineral oil asphaltic bitumen to a temperature in excess of about 100° C. in the presence of a minor proportion up to about 5% by weight of picric acid.

8. Process for the manufacture of asphaltic bituminous compositions which comprises subjecting a mineral oil asphaltic bitumen to an elevated temperature of from about 100° C. to about 450° C. in the presence of a minor proportion of a dinitrocresol.

9. Process for the manufacture of asphaltic bituminous compositions which comprises subjecting a mineral oil asphaltic bitumen to an elevated temperature of from about 100° C. to about 450° C. for a period of time ranging upwards from a few minutes to several hours in the presence of from a fraction of one percent up to a few percent by weight, based on the weight of the asphaltic bitumen, of a polynitrophenol.

10. Process for the manufacture of asphaltic bituminous compositions which comprises subjecting a mineral oil asphaltic bitumen to an air-blowing treatment at an elevated temperature of from about 100° C. to about 450° C. in the presence of a minor proportion of a polynitrophenol.

11. Process for the manufacture of asphaltic bituminous compositions which comprises subjecting an asphaltic material to treatment with an oxygen-containing gas at a temperature of from about 100° C. to about 450° C. for a period to time ranging upwards from a few minutes to several hours in the presence of from a fraction of one per cent up to a few per cent by weight, based on the weight of the asphaltic material of picric acid.

12. Process for the manufacture of asphaltic bituminous compositions which comprises subjecting an asphaltic material to treatment with an oxygen-containing gas at a temperature of from about 100° C. to about 450° C. for a period of time ranging upwards from a few minutes to several hours in the presence of from a fraction of one per cent up to a few per cent by weight, based on the weight of the asphaltic material, of a dinitrophenol.

13. Process for the manufacture of asphaltic bituminous compositions which comprises subjecting a cracked residual asphalt to a temperature of from about 100° C. to about 450° C. in the presence of a minor proportion up to about 5% by weight of a polynitrophenol.

14. A process for the manufacture of asphaltic bituminous compositions which comprises subjecting a mineral oil asphaltic bitumen to a temperature in excess of about 100° C. in the presence of a minor proportion up to about 5% by weight of a polynitrophenol.

JACOB van den BERGE.

REFERENCES CITED

The following references are of record in the file of this patent:

UNITED STATES PATENTS

| Number | Name | Date |
| --- | --- | --- |
| 1,340,855 | Weiss | May 18, 1920 |